May 5, 1970     G. R. CARLSON     3,510,000
MACERATOR UNIT
Original Filed Nov. 10, 1966
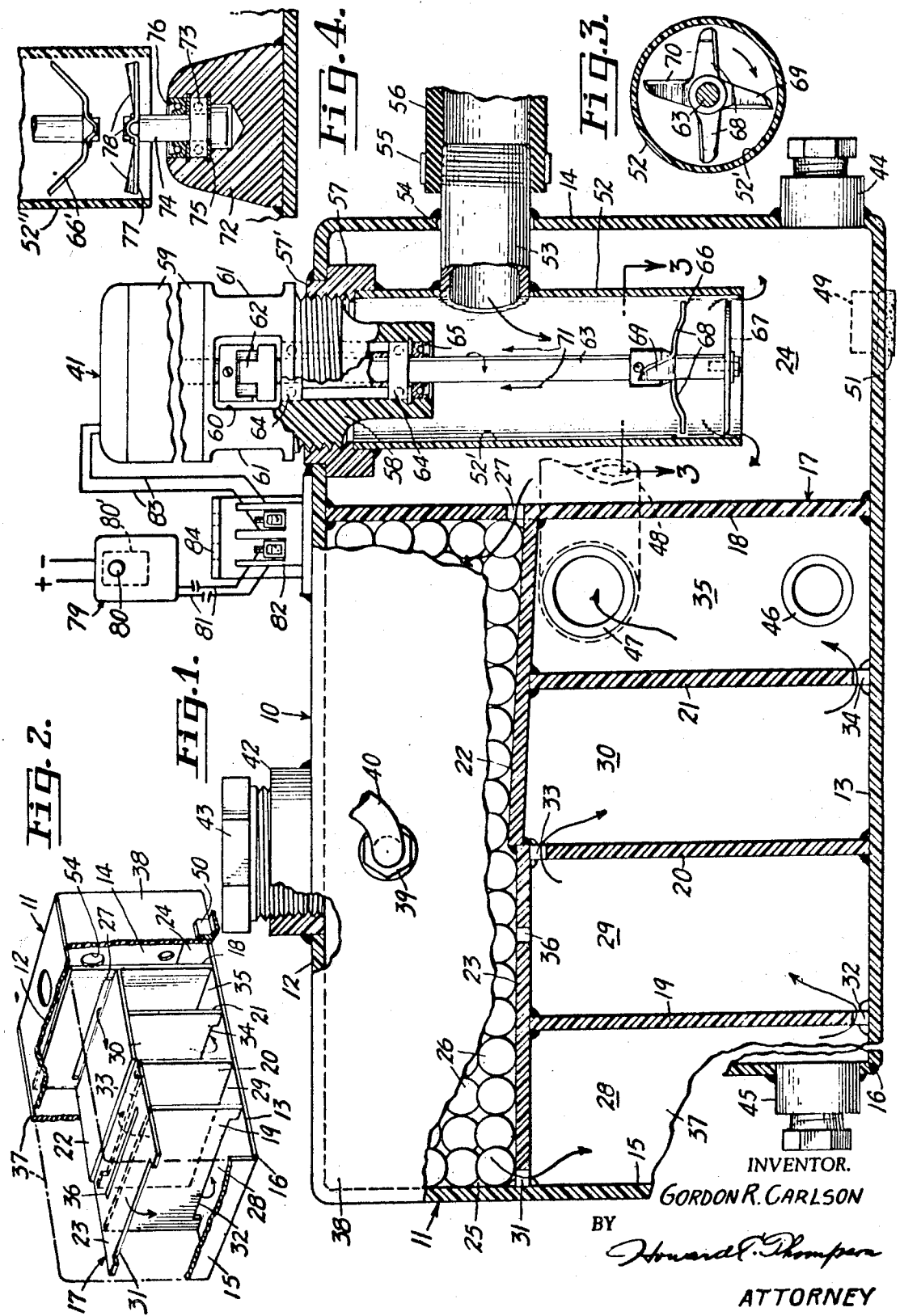
INVENTOR.
GORDON R. CARLSON
BY
Howard F. Thompson
ATTORNEY United States Patent Office 3,510,000
Patented May 5, 1970

3,510,000
MACERATOR UNIT
Gordon R. Carlson, P.O. Box 16, North Dayton Station,
Metuchen, N.J. 08840
Original application Nov. 10, 1966, Ser. No. 593,556.
Divided and this application Aug. 9, 1967, Ser. No.
659,517
Int. Cl. B01d 21/24
U.S. Cl. 210—152                                    10 Claims

ABSTRACT OF THE DISCLOSURE

A treatment unit for use on toilets such as in watercraft includes a macerator having a motor driven blade mounted to rotate within a tubular body in spaced relation to an inlet near the top of the body, and a discharge control plate near the bottom of the tube, forming a restricted freely open passage between the plate and the tube wall, through which only small particles can pass.

CROSS REFERENCE TO RELATED
APPLICATION

This application is a division of application Ser. No. 593,556, filed Nov. 10, 1966 now abandoned in the name of Gordon R. Carlson for Treatment Unit for Pollution Control Systems.

BACKGROUND OF THE INVENTION

This invention relates to a treatment unit for toilets, particularly as may be used in boats and other vehicles where the effluent from the toilet must be treated. Prior art devices have included various forms of macerator units. However, in general, these units have not recognized the desirability of reducing to a predetermined size all solids in the effluent, whereby effective chemical treatment can be achieved to kill substantially all bacteria in the effluent.

SUMMARY OF THE INVENTION

The present invention provides a treatment unit for flushing toilet accommodations on boats and the like, wherein a macerator is provided, through which all effluent from the toilet is passed and, in which, all solids are reduced to no greater than a predetermined small particle size, after which, the effluent containing the small particles is passed through a chemical treating stage, in which bacteria are killed.

The macerator unit provides adequate space within itself to achieve whatever holding or recirculation of solids is necessary to achieve the maceration to the predetermined small particle size and, in particular, a holding plate precisely located with respect to the walls of the macerator defines therewith a passage of predetermined small cross-section, through which particles of no greater than the desired size can pass. The holding plate is rotatable with respect to the walls of the tubular macerator unit body in order to minimize clogging of the passageway and also to cooperate with the macerator blade in achieving a thorough reduction in size of solids. The tubular macerator body may be partially immersed in effluent containing some quantity of corrosive treating material, such as chlorine dissolved in the partially treated effluent. Therefore, the drive motor and all bearings are mounted substantially above the normal static liquid level within the unit to minimize corrosive action on the bearings and motor parts. Furthermore, the entire motor and macerator unit is constructed such that it can readily be separated from the treatment unit for cleaning, repair or replacement.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side and sectonal view of a unit with parts of the construction broken away, parts shown in elevation, and indicating by arrows the general flow of the system.

FIG. 2 is a diagrammatic perspective view of the casing assemblage, with wall portions broken away and indicated, in part, in dot-dash lines.

FIG. 3 is a section on the line 3—3 of FIG. 1, omitting background showing; and

FIG. 4 is a diagrammatic sectional view of part of the structure shown in FIG. 1 and illustrating a modification, with parts of the structure shown in elevation.

In illustrating one adaptation and use of the invention, FIG. 1 diagrammatically shows a treatment unit 10, constituting an assemblage of various components of the unit. At this time, it is pointed out that most of the parts of the unit, except for the motor and pars driven by the motor, are formed from suitable plastics and, in part, this is illustrated by the sectioning. By way of example, polyvinylchloride can be employed.

Considering FIG. 1, 11 is the casing of the unit. In the present showing, the casing is formed from various sheets or strip parts, a long strip forming the top wall 12, bottom wall 13, and end walls 14 and 15, the ends 13 and 15 being welded, as seen at 16, by a plastic weld. This forms what can be termed an O-shaped casing. The wall structure of this casing, in another method of procedure, could be an extruded tube cut to the required casing width.

Arranged within the casing 11 is a pre-formed partition assemblage, generally identified by the reference 17. Considering FIG. 2, this assemblage could also be extruded and then cut to form the various openings, later described. However, as shown in FIG. 1, the assemblage 17 is formed from a series of preformed partition plates which are welded together, as diagrammatically shown.

The assemblage 17 comprises a tall partition 18, three short partitions 19, 20 and 21, and two partition plates 22–23, collectively forming a supplemental top wall extending between 15 and 18.

The assemblage 17, when mounted in the casing 11, forms a primary holding area 24, a secondary and treatment area 25 in which normally solid soluble calcium hypochlorinate tablets 26 are arranged. The tablets may be said to comprise treatment agents or elements. At this time, it is pointed out that the arrangement of the tablets in the area 25 provides a filtration expediting the chlorination action, particularly if large particles in the effluent have passed from the area 24 into the tablet area 25. It will be apparent that the wall 22 is inclined downwardly in the direction of the area 24, which will cause some of the chlorine to drain into the area 24 through the passage 27 in the wall 18. This will provide partial treatment of the effluent in area 24 before passage into the area 25. Passage 27 is an elongated aperture, as will appear from the diagrammatic showing in FIG. 2.

The partitions 19, 20 and 21 form what might be termed baffled holding areas 28, 29 and 30. The plate 23 has a passage 31, placing area 25 in communication with area 28. Partition 19 has, at its lower end, a passage 32 placing area 28 in communication with area 29. Partition 20 has, at its upper end, a passage 33, placing area 29 in communication with area 30, and partition 21 has a passage 34 at its lower end, placing the area 30 in communication with a discharge area 35. The contours of the passages 31, 32, 33 and 34 are clearly shown by the cutaway portions in the plates 23, 19, 20 and 21 in FIG. 2. Also in this figure is illustrated the elongated vent aperture 36 in plate 23.

The casing 11 also has side plates or walls 37 and 38. Mounted in the plate 38 is a hose coupling 39, with which a vent hose 40 is coupled to extend the vent to any practical position on the boat, in connection with which the unit 10 is mounted for ventillation of the unit. The side walls of the casing are suitably cemented to the side edges of 11, 18, 19, 20, 21, 22 and 23 in completing the wall structure of the unit 10.

In forming the casing 11, two apertures are formed in the top wall 12, one aperture for receiving a macerator assemblage 41, and the other aperture for receiving a threaded coupling sleeve 42, with which a closure plug 43 operates. This latter structure provides means for filling and refilling the tablets 26 in the area 25, as may be required. The walls 14, 15 and 37 are also apertured to receive sleeves 44, 45 and 46, respectively, these sleeves being similar to the sleeve 42, and receive drain plugs, generally similar to the plug 43. Two of these are shown on 44 and 45. The sleeve 46 opens into the discharge area 35. Another aperture is formed in the side wall 37 to receive another outlet sleeve 47. Coupled with the sleeve 47 is a discharg hose, indicated, in part, in dotted lines at 48 in FIG. 1.

Welded to the outer surface of each of the side plates 37–38 are L-shaped coupling brackets. One of the brackets of the plate 37 is indicated in dotted lines at 49 in FIG. 1, and at 50, FIG. 2, is shown one bracket on the plate 38. These brackets preferably have cushioned feet, one of which is shown at 51 on 49.

The assemblage 41 comprises a macerator tube 52, apertured at one side to receive a threaded intake pipe 53 welded to the tube 52 and also to the wall 14. This pipe passes through an aperture 54 in the wall 14, the aperture 54 being larger in diameter than the diameter of the pipe 53, for reasons later described. Fixed to the pipe 53 by a standard hose clamp 55 is a rubber tube 56, which extends to the toilet being serviced.

Mounted on and welded to the tube 52 is a pipe threaded coupling sleeve 57, having a reduced upper end 57'. This end is welded in the first named aperture of the top wall 12. At 58 is shown a motor mounting block, threaded to engage the pipe thread of 57 for detachable mounting of the macerator part of the assemblage 41.

The electric drive motor 59 of the assemblage 41 is suitably fixed to the upper portion of the block 58. This upper portion has side openings 60 and flat sides 61 for use of a wrench when necessary. At 62 is shown a motor shaft coupling, with which a drive shaft 63 of the macerator is coupled. In the lower portion of the block 58 are spaced ball bearings 64 for the shaft 63 and at 65 is shown a sealing ring engaging the shaft 63.

Fixed to the lower portion of the shaft 63 is a macerator blade 66 and fixed to the lower end of the shaft at the outlet end of the tube 52 is a discharge control and holding plate 67, the diameter of which is less than the diameter of the bore 52' of the tube 52 to control the maximum size of the particles discharged at the outlet end of the tube 52. The plate 66 has two opposed downwardly curved impellers 68 and two opposed upwardly flared impellers 69. All of the impellers have bevelled cutter edges 70, note FIG. 3. In operation of the blade 66 at about 3000 r.p.m., the effluent delivered to the tube 52 is forced upwardly, as indicated by the arrows 71, FIG. 1, for an effective maceration of the effluent delivered to the tube 52, prior to discharge around the plate 67 into the area 24 and for later delivery into the area 25 for chlorination treatment.

With the structure shown in FIG. 1, the plate 67 rotating the blade 66 could, to a degree, retard the thorough maceration of the effluent beneath blade 66. This condition can be obviated by the modified showing in FIG. 4. Here, a bearing block 72 is welded to the bottom wall 13 of the casing 11. The block 72 supports a ball bearing 73, in which a stub shaft 74 freely rotates. The shaft 74 has an enlarged lower end engaged by a snap ring 75 to hold the shaft 74 in position. At 76 is shown a sealing ring engaging the shaft 74. The shaft 74 extends into the tube 52″, which is similar in all respects to the tube 52. Fixed to the upper end of the shaft 74 is a disc 77, differing from the disc 67 in having four radially rounded and inwardly tapering upper ribs 78. These ribs act as blades engaged by the effluent below the blade 66' to break up and further act upon the effluent in producing a more perfect maceration action. It will be apparent that the disc 77 will rotate at a speed less than the speed of rotation of the blade 66', being driven only by movement of the effluent below the blade 66'.

Mounted at the toilet area is an electric control box, diagrammatically outlined at 79. Electric wires from a source enters this box, as shown. On the box is a push-button switch 80, controlling the circuit to the motor 59. The circuit wires 81 from the box 79 extend to a circuit coupler 82 mounted on the casing 11 adjacent the motor 59. Extending from coupler 82 are the circuit wires 83 leading to the motor 59. At 80' is indicated a timer in the box 79 for maintaining the circuit to the motor 59 closed for a predetermined period of time as, for example, sixty seconds, to care for the full discharge of the effluent from the toilet into the macerator tube 52. Arranged over the circuit coupler 82 is a plastic hood or guard 84.

In the use of the unit and when the motor 59 is not in operation, a fluid level would be established in the area 24, substantially in alinement with the discharge opening or passage 27. Further, keeping in mind that the discharge through the hose 48 is usually by gravity through the hull of the boat, the level of the treated or chlorinated liquid will be maintained in chambers 28, 29, 30 and 35 below the discharge at 47. However, when there is a discharge from a toilet through the hose 56 into the tube 52 and the motor 59 is in operation, there will be created a circulation of the effluent into the several areas, as diagrammatically illustrated by the arrows, shown in FIG. 1 of the drawing. This circulation takes place each and every time that the push-button 80 is actuated. As previously stated, in operation of the unit, part of the effluent introduced into the area 25 and treated by the tablets 26 can drain back into the chamber 24, which brings into this chamber part of the chlorine and which helps to treat the effluent initially delivered into the area 24, thus expediting the treatment cycle of operation of the unit.

To understand the general assemblage of the casing 11, it is pointed out that, after the welding operation at 16 in forming the O-shaped contour of the boundary walls of the casing, the first assemblage is the mounting of the tube 52 with the attached pipe 53 and the attached coupling sleeve 57 into the casing. Here, the enlarged diameter of the aperture 54 will assist in passing the pipe 53 through the aperture 54, while at the same time flexing the top wall 12 of the casing upwardly to a degree sufficient to pass the reduced upper end 57' of the sleeve 57 through the aperture in the top wall 12. The plastic material from which the casing is constructed has sufficient flexibility to accomplish this end result. When this assemblage has been made, the welding operations securing the sleeve 57 and the pipe 53 in position are performed with suitable jigs or the like for maintaining proper alinement of the tube 52 in the casing. On completing this operation, the assemblage of all the partition plates are mounted in the casing and secured in position by the welds, as diagrammatically illustrated. Here, it is to be kept in mind that the side walls of the casing have not been attached. At this time, it is also well to point out that the assemblage, as diagrammatically shown in FIG. 2, is, of course, not consistent with the procedure noted above but, to clarify and simplify the FIG. 2 showing, the sube 52 and its components, as well as the assemblage 41, have been omitted. The purpose of the showing in FIG. 2 is primarily to clearly illustrate the casing wall structures.

With regard to the macerator assemblage 41, this assemblage can be attached and detached, at will, for cleaning or other purposes. The attachment can be made by hand. However, at times, removal of the assemblage 41 may require the use of a wrench and, for this purpose, the flat sides 61 have been provided on the block 58.

In drainage treatment of the unit 10, wires 81 from the control box 79 are first detached from the circuit coupler 82. Then, both of the rubber hoses 48 and 56 are detached and 47 and 53 closed by closure plugs, in order to prevent spilling of the contents of the unit in transporting the same to a place where the unit is drained. In this drainage, the various sleeves 44, 45 and 46 are unplugged in the drainage of the area 24, as well as in draining the areas 28, 29, 30 and 35, it being understood that the area 25 will be drained into 24 and 28. In this drainage, the unit can be flushed with water or any other flushing liquid by introduction through 47 and 53 upon removing the plugs which had been attached.

For purposes of description, 24 can be regarded as the maceration delivery area or means, which area includes means for delivery of the effluent to a macerator tube, from which the macerated effluent is discharged into said area. The area 25 can be defined as a treatment area or means, the areas 28, 29 and 30 as the baffled areas or means and 35 as the discharge area or means. Further, in a simpler identification 24 can be termed a first holding area, 25 the treatment and 28, 29 and 30 can collectively be regarded as a further holding area.

Having fully described my invention, what I claim as new and desire to secure by Letters Patent is:

1. A treatment unit for the effluent from a flushing toilet, comprising a casing including partitions defining a first holdng area, a treatment area communicating with said first area and a further holding area receiving the flow from said treatment area, an inlet pipe, a discharge tube leading from said further holding area, a macerator unit including a tube connected with said inlet pipe and having an outlet end for discharge into said first holding area, a drive shaft extending into said macerator tube, a motor connected to rotate said shaft, a macerator blade mounted on said shaft inwardly of and spaced from the outlet end of said macerator tube, discharge control means cooperating with said macerator tube outlet end to form a restricted freely open passage, through which only particles of a predetermined maximum size can pass into said first holding area, and means in said treatment area operating to add a treating agent to the macerated effluent.

2. A treatment unit as defined in claim 1, wherein said macerator blade includes impellers operable to induce a recirculation flow of material in said macerator tube between said inlet pipe and said first named means.

3. A treatment unit as defined in claim 1, wherein said treatment area is elevated with respect to said macerator tube outlet end and said further holding area, whereby the effluent discharged from said macerator tube overflows from said first holding area through said treatment area and then into said further holding area.

4. A treatment unit as defined in claim 1, wherein means is provided returning a part of the treated effluent to said first holding area.

5. A treatment unit as defined in claim 4, wherein said last named means comprises a bottom wall of said treatment area inclined to establish a drain of the treatment area back into said first holding area.

6. A treatment unit as defined in claim 1, wherein said last named means comprises chlorine treatment tablets positioned in said treatment area, and said tablets forming in said treatment area of filtration action upon the macerated effluent passing through said treatment area.

7. A treatment unit as defined in claim 1, wherein said further holding area comprises a plurality of baffled holding areas, and one of said last named holding areas opening into a discharge area, in connection with which said discharge tube communicates.

8. A treatment unit as defined in claim 1, wherein means is employed for detachably mounting the motor, drive shaft, and macerator blade with respect to said macerator tube.

9. A treatment unit as defined in claim 1, wherein said discharge control means comprises a plate, the structure of which controls the restricted freely open passage, through which particles of the effluent pass.

10. A treatment unit of the character defined, comprising a casing, means for delivery of an effluent to macerator means supported in said casing, said macerator means including an electric motor driving a macerator blade, said macerator means including a plate for discharge of macerated effluent into a delivery means in communication with a chlorine treatment means in said casing, said casing further including a plurality of intercommunicating treated effluent holding baffled means and a treated effluent discharge means communicating with one of said baffled means, said treatment means being in communication with a first baffled means, means on the casing for delivery of chlorine tablets to said fourth named means, means for draining the third, fifth and sixth named means, means for venting the fourth and fifth named means, means positioned at a toilet controlled by said unit for controlling operation of the electric motor, and an electric circuit coupler in circuit with said last named means and mounted on the casing adjacent said electric motor and in circuit with said motor.

References Cited

UNITED STATES PATENTS

| | | | |
|---|---|---|---|
| 2,486,691 | 11/1949 | Travers | 210—201 X |
| 2,676,666 | 4/1954 | Howe | 210—173 X |
| 3,247,970 | 4/1966 | Jellesna | 210—174 |

JOHN W. ADEE, Primary Examiner

U.S. Cl. X.R.

210—196, 206; 241—46.17, 79.1, 101